United States Patent
Ukai

(10) Patent No.: US 7,676,650 B2
(45) Date of Patent: Mar. 9, 2010

(54) APPARATUS FOR CONTROLLING INSTRUCTION FETCH REUSING FETCHED INSTRUCTION

(75) Inventor: Masaki Ukai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 550 days.

(21) Appl. No.: 10/347,193

(22) Filed: Jan. 21, 2003

(65) Prior Publication Data

US 2004/0003202 A1    Jan. 1, 2004

(30) Foreign Application Priority Data

Jun. 28, 2002   (JP) .............................. 2002-191432

(51) Int. Cl.
*G06F 9/30*   (2006.01)
*G06F 9/40*   (2006.01)
(52) U.S. Cl. .................. 712/205; 712/219; 712/241
(58) Field of Classification Search ................ 712/241, 712/205
See application file for complete search history.

(56) References Cited

U.S. PATENT DOCUMENTS

| | | | | |
|---|---|---|---|---|
| 3,490,005 A | * | 1/1970 | Anderson et. al. | 712/241 |
| 4,876,642 A | * | 10/1989 | Gibson | 712/233 |
| 6,959,379 B1 | * | 10/2005 | Wojcieszak et al. | 712/241 |
| 6,988,190 B1 | * | 1/2006 | Park | 712/241 |
| 2002/0078330 A1 | * | 6/2002 | Sturges et al. | 712/237 |

FOREIGN PATENT DOCUMENTS

| | | |
|---|---|---|
| EP | 0 394 711 | 10/1990 |
| JP | 58-222348 | 12/1983 |
| JP | 2-35525 | 2/1990 |
| JP | 2-287626 | 11/1990 |
| JP | 2-306340 | 12/1990 |
| JP | 4-182735 | 6/1992 |

OTHER PUBLICATIONS

Trace Cache: a Low Latency Approach to High Bandwidth Instruction Fetching; Eric Rotenberg, Steve Bennett, and James Smith, 1996.*

Japanese Patent Office Notice of Rejection Grounds for Japanese Patent Application No. 2002-191432, dated Feb. 7, 2006.

* cited by examiner

*Primary Examiner*—Niketa I Patel
*Assistant Examiner*—Jesse R Moll
(74) *Attorney, Agent, or Firm*—Staas & Halsey LLP

(57) ABSTRACT

When an instruction stored in a specific instruction buffer is the same as another instruction stored in another instruction buffer and logically subsequent to the instruction in the specific instruction buffer, a connection is made from the instruction buffer storing a logically and immediately preceding instruction, not the instruction in the other instruction buffer, to the specific instruction buffer without the instruction in the other instruction buffer, and a loop is generated by instruction buffers, thereby performing a short loop in an instruction buffer system capable of arbitrarily connecting a plurality of instruction buffers.

16 Claims, 13 Drawing Sheets

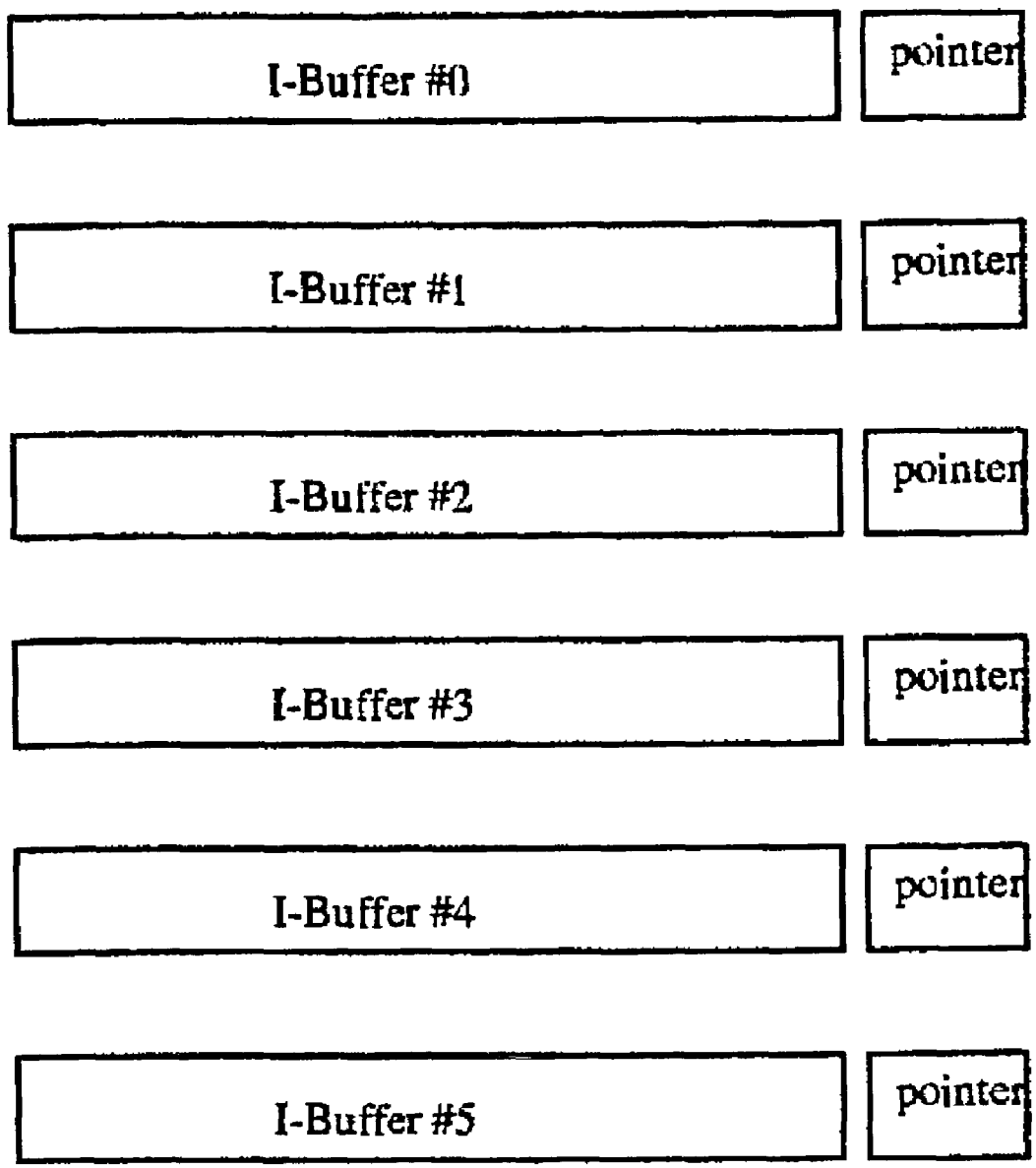
F I G. 3

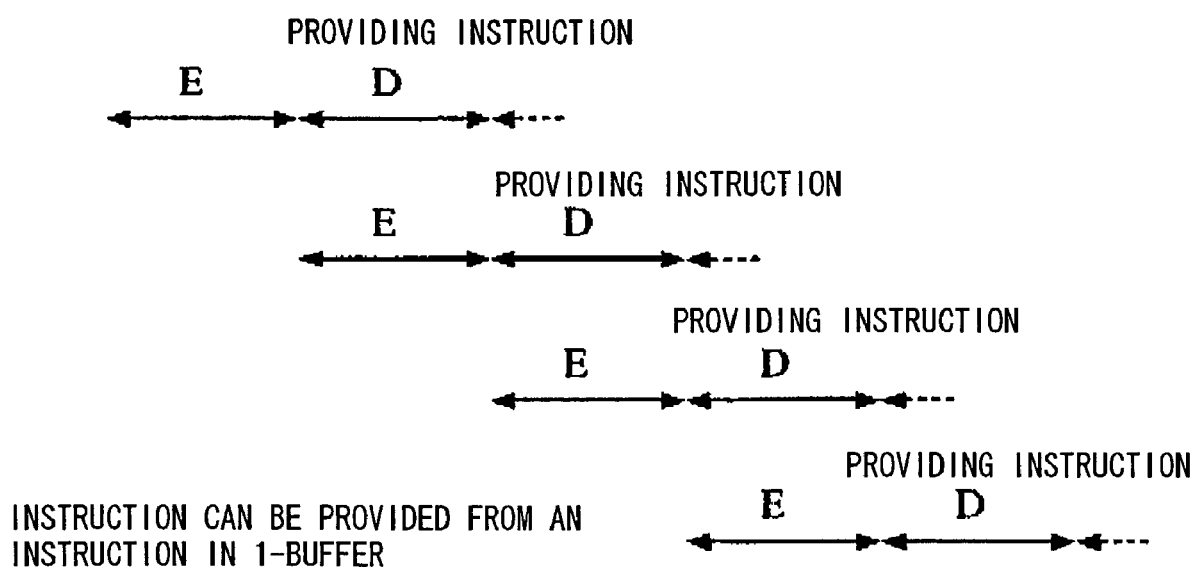
F I G. 5

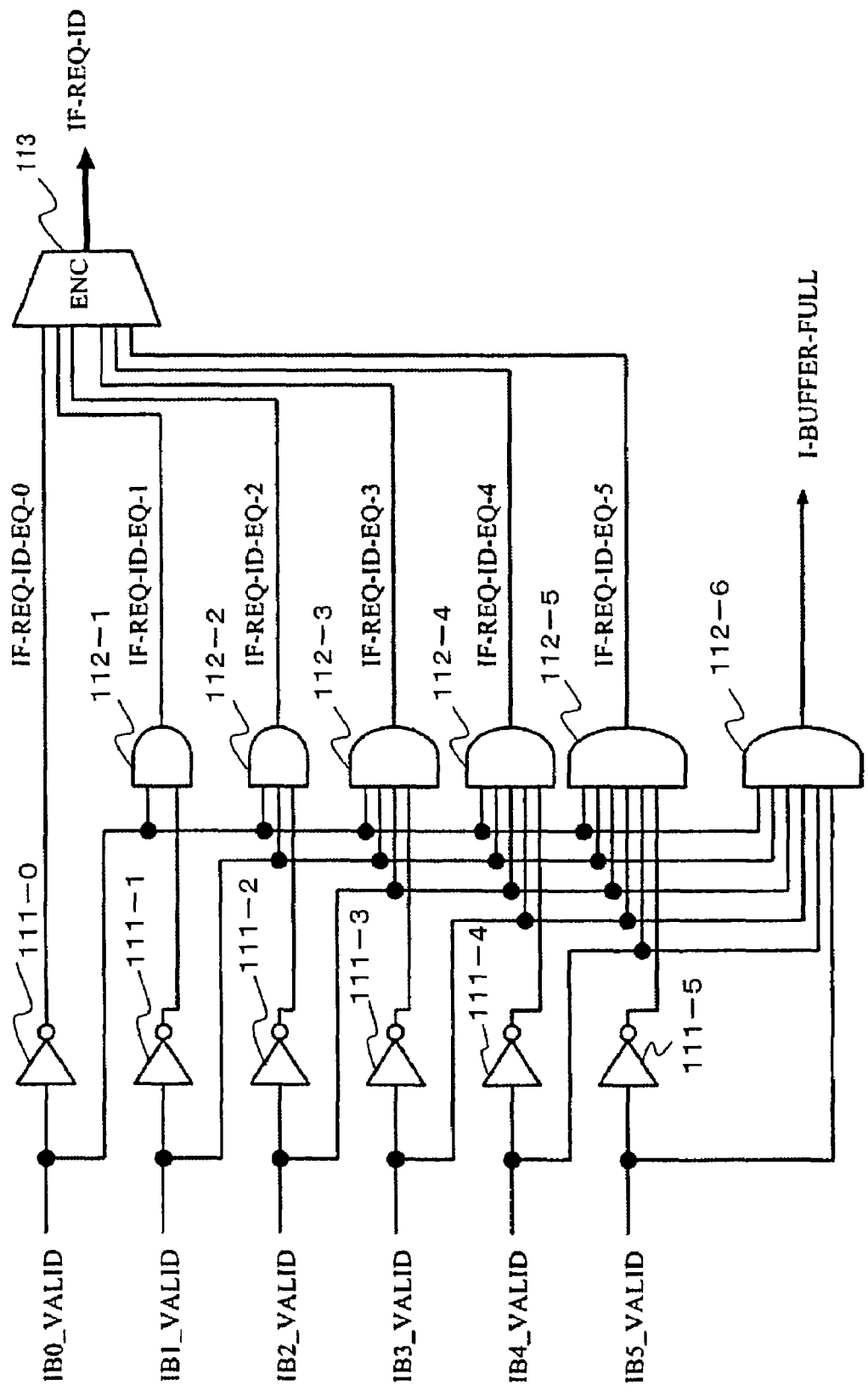
F I G. 7

APPARATUS FOR CONTROLLING INSTRUCTION FETCH REUSING FETCHED INSTRUCTION

BACKGROUND OF THE INVENTION

1. Field of the Invention

The present invention relates to the apparatus for providing an instruction for an information processing device, and especially for an instruction executing unit.

2. Description of the Related Art

In an information processing device operated with an advanced instruction processing system after the pipeline processing system, the performance has been improved by processing the subsequent instructions speculatively without waiting for the completion of the execution of one instruction. It is obvious that the performance has also been improved by supplying an instruction (instruction fetch) speculatively before the instruction execution.

For example, the required and satisfactory instruction supply ability has been reserved for an execution unit by closely associating an instruction fetch with a branch prediction system and configuring an instruction fetch unit completely separated from an instruction execution unit, and the performance having high instruction fetch has been reserved.

FIGS. 1A, 1B and 2A show conventional problems.

A branch predicting operation normally takes some time from an instruction fetch request. Therefore, a predicted branch target instruction fetch request issued when a selection of a branch is estimated from the original request is delayed (for example by 3τ (τ indicates a machine cycle), etc.). This process is shown in FIG. 1A.

That is, with the configuration of the conventional instruction buffer, when a branch selection prediction is frequently made, a time loss in predicting a target branch instruction is apparent. Especially, in a busy short loop in which several instructions forms a loop instruction sequence as shown in FIG. 1B, the loss is observed for each loop as shown in FIG. 2, thereby having a large impact on the performance.

For example, in the case of the instruction sequence (filling memory with constants) shown in FIG. 1B, writing 1000 bytes makes 250 loops. Therefore, the instruction execution unit uses the super-scalar system. In this system, if the instruction sequence can be processed in 1τ (simultaneously for four instructions), then 2τ is completely lost per loop by a target instruction fetch wait if the reference penalty of a branch prediction is 3τ. Therefore, it takes 750τ using the short loop while a 1000 byte write can be performed by a high performance instruction execution unit in 250τ without the short loop.

To solve the above mentioned problem, an instruction code in which software (compiler) has developed a short loop is prepared in advance so that a branch prediction loss can be concealed although a repeated process appears in the conventional technology. However, in this method, the instruction code involuntarily increases, and there arises a laborious process of reconstructing prepared software.

SUMMARY OF THE INVENTION

The present invention aims at providing an instruction fetch control apparatus capable of efficiently processing a short loop.

An instruction fetch control apparatus includes an instruction buffer unit having a plurality of instruction buffers and a pointer unit having the instruction buffer connection relation with the instruction buffers, and a connection relation establishment unit for establishing the connection relation between the instruction buffers different from an instruction fetch request depending on the type of instruction stored in the instruction buffers.

An instruction fetch control method includes an instruction buffer step having a plurality of instruction buffers and a pointer unit having the instruction buffer connection relation with the instruction buffers, and a connection relation establishing step of establishing the connection relation between the instruction buffers different from an instruction fetch request depending on the type of instruction stored in the instruction buffers.

According to the present invention, in the case of instructions repeatedly executed by repeating a small number of instructions as a short loop, making a branch prediction for each instruction fetch takes a long time for the branch prediction, thereby reducing the performance of an information processing device. Therefore, when a branch instruction, etc. forming a short loop is detected, or when there is an instruction which is logically subsequent to another instruction, and has the same address as the instruction found in a plurality of instruction buffers, a loop-shaped connection structure is configured among the plurality of instruction buffers so that an instruction can be directly supplied from an instruction buffer for execution of the instruction.

Thus, an instruction as a short loop can be free of an instruction fetching operation and a branch predicting operation for each repeated execution, thereby quickly executing instructions.

BRIEF DESCRIPTION OF THE DRAWINGS

FIG. 3 shows the outline of an instruction buffer used in the embodiments of the present invention;

FIG. 5 shows the effect of the embodiment of the present invention;

FIG. 7 shows an example of the configuration of the circuit generating IF-REQ-ID included in an instruction fetch request unit 10;

DESCRIPTION OF THE PREFERRED EMBODIMENTS

FIG. 3 shows the outline of an instruction buffer used in the embodiments of the present invention. In FIG. 3, it is assumed that an instruction buffer comprises six buffers. The buffer used in the present embodiment comprises a buffer unit storing data and a pointer unit indicating a buffer storing an instruction to be executed after the current instruction stored in another buffer.

With the above mentioned configuration, the instruction sequence after a specific instruction sequence stored in a first buffer unit is stored in any available buffer in the remaining five buffers, and an ID of the buffer storing the next instruction sequence after the specific instruction sequence is stored in a pointer unit corresponding to the first buffer.

Then, when an instruction sequence is read from a buffer, the first instruction is sequentially read, and after reading a specific instruction sequence, the pointer unit is referred to, and an instruction sequence is read from the buffer unit indicated by the ID stored in the pointer unit. The pointer unit can store an address in the buffer of an instruction sequence specifying the position of the buffer unit from which instructions are read.

Figures 1A, 1B:
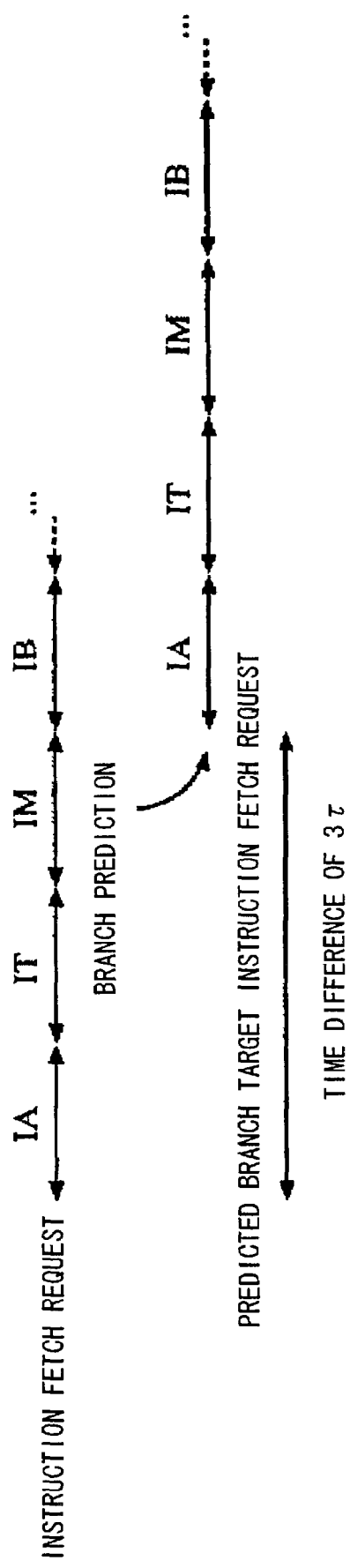
FIGS. 1A and 1B show the conventional problems (1)
Figure 2:
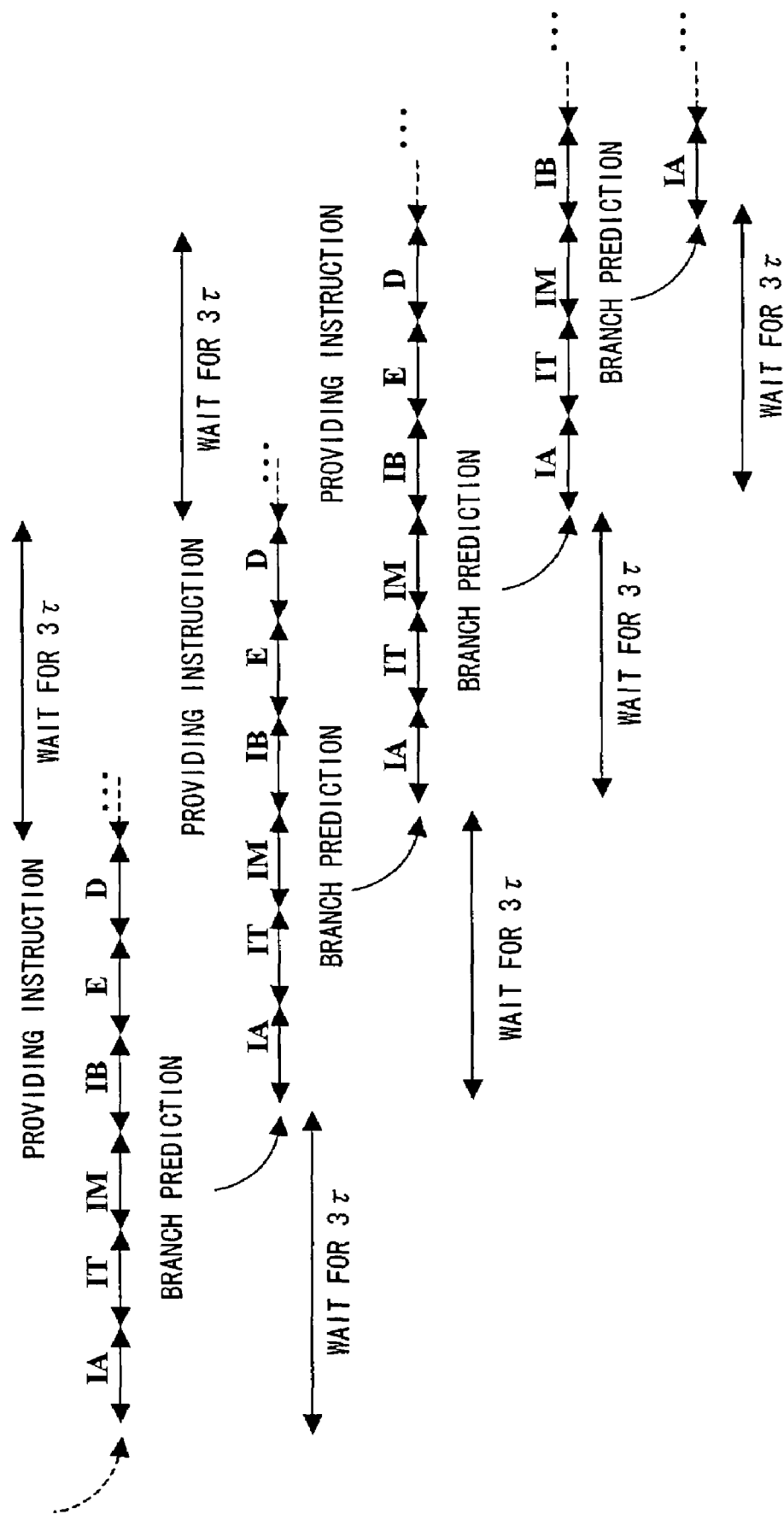
FIG. 2 shows the conventional problems (2)

By configuring the instruction buffers as described above, the provided buffers can be flexibly associated with one another. Therefore, an instruction sequence can be stored in any buffer, and an instruction can be supplied (instruction fetch) by efficiently using the six buffers provided as shown in FIG. 1.

FIGS. 4A through 4D show the outline of the concept of the embodiments of the present invention using an instruction buffer.

Figure 4A:
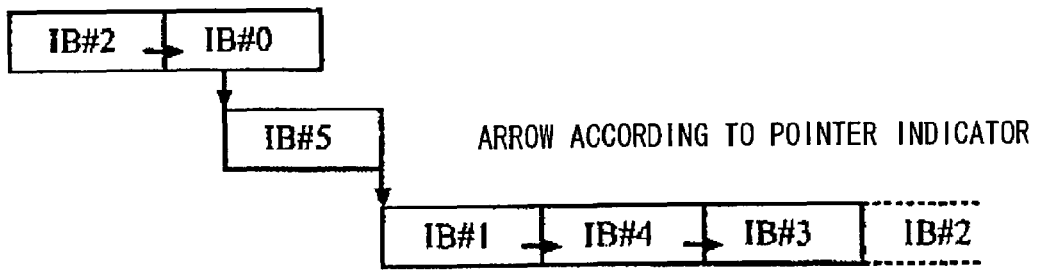
FIGS. 4A through 4D show the outline of the concept of the embodiments of the present invention using an instruction buffer.
Figure 4B:
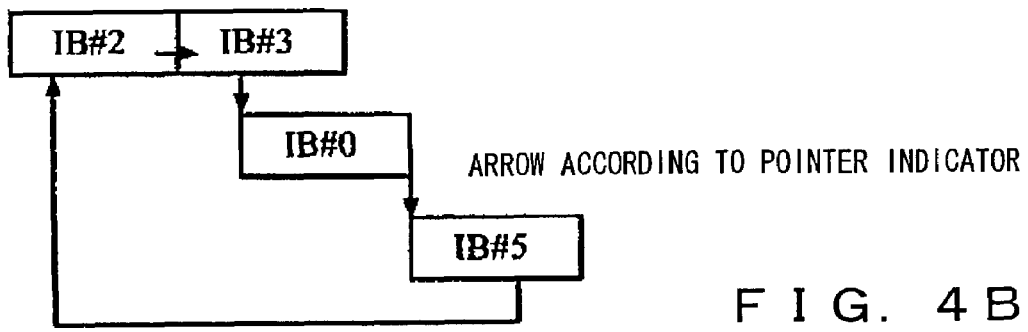
Figure 4C:
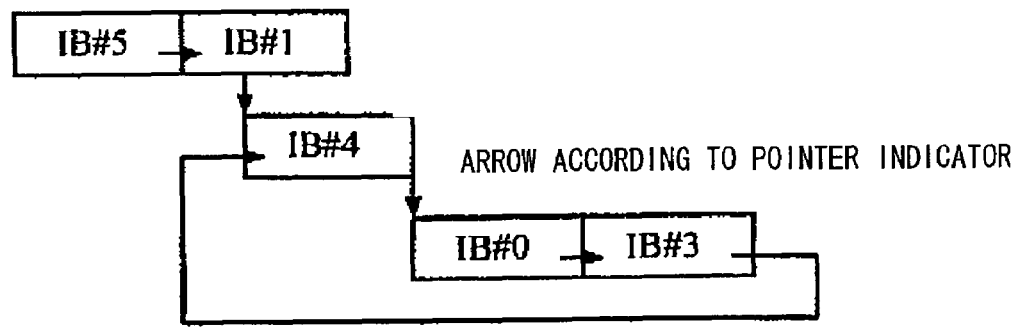
Figure 4D:
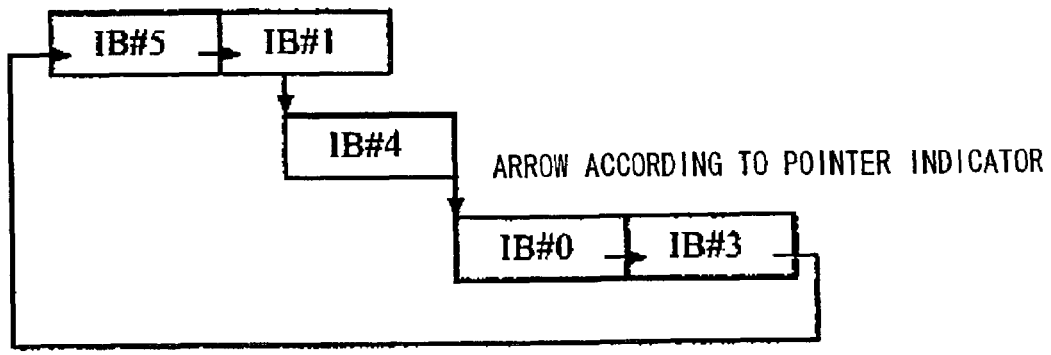

In FIG. 4A, the association using a pointer (specifying a target) is performed on an instruction request issued after the current instruction buffer. However, in FIGS. 4A through 4D, although an instruction request is issued before the instruction buffer, a pointer can successfully function by pointing to any instruction buffer storing an instruction matching the logically subsequent instruction. That is, a state of a loop of instruction buffers is generated.

With the above mentioned configuration, it is not necessary to issue an instruction fetch request during the process in a loop, and an instruction can be supplied constantly from an instruction buffer. Therefore, a bubble loss of a branch prediction can be removed, and the optimum supply speed can be guaranteed. FIG. 3 shows this process.

FIG. 5 shows the effect of the embodiment of the present invention.

As shown in FIG. 5, with the configuration of a loop of instruction buffers, it is not necessary to newly read an instruction because instructions have already been stored, thereby an instruction can be executed directly from the instruction buffer. Therefore, when an instruction is executed, the instruction can be immediately supplied, and the problem of the above mentioned demerit of the short loop can be solved. That is, the delay by the branch prediction generated when a short loop is executed is 0τ.

Especially, since a connection target of an instruction buffer is conventionally an existing and preceding instruction buffer, a satisfactory effect can be attained if it is not a simple and explicit short loop instruction sequence depending on the number of instruction buffers.

Furthermore, in a branch prediction system (especially in a global history prediction system (an instruction buffer prediction system storing a history deeper than a branch history, and capable of holding several times of repeated execution as a history for a short loop)), an instruction of an instruction fetch sequence in an instruction buffer is decoded and then a branch prediction is performed. In this branch prediction system, when a state of exiting a loop at a certain time point is predicted, an instruction fetching operation can be performed based on a branch prediction by releasing the above mentioned loop structure.

Otherwise, in certain processor specifications, when the CPU in another system rewrites the instruction area of its own CPU in a multi-CPU configuration, there can be restrictions that, for example, the rewriting event has to be reflected on a certain condition. In this case, it is necessary to perform control by fetching an instruction area rewritten by polling an instruction cache coherence-controlled at predetermined time intervals. To attain this, a system of releasing a loop structure which has been closed by an instruction buffer can be available.

In the present embodiment, the case in which an instruction address corresponding to each instruction buffer is assigned is described below.

Figure 6:
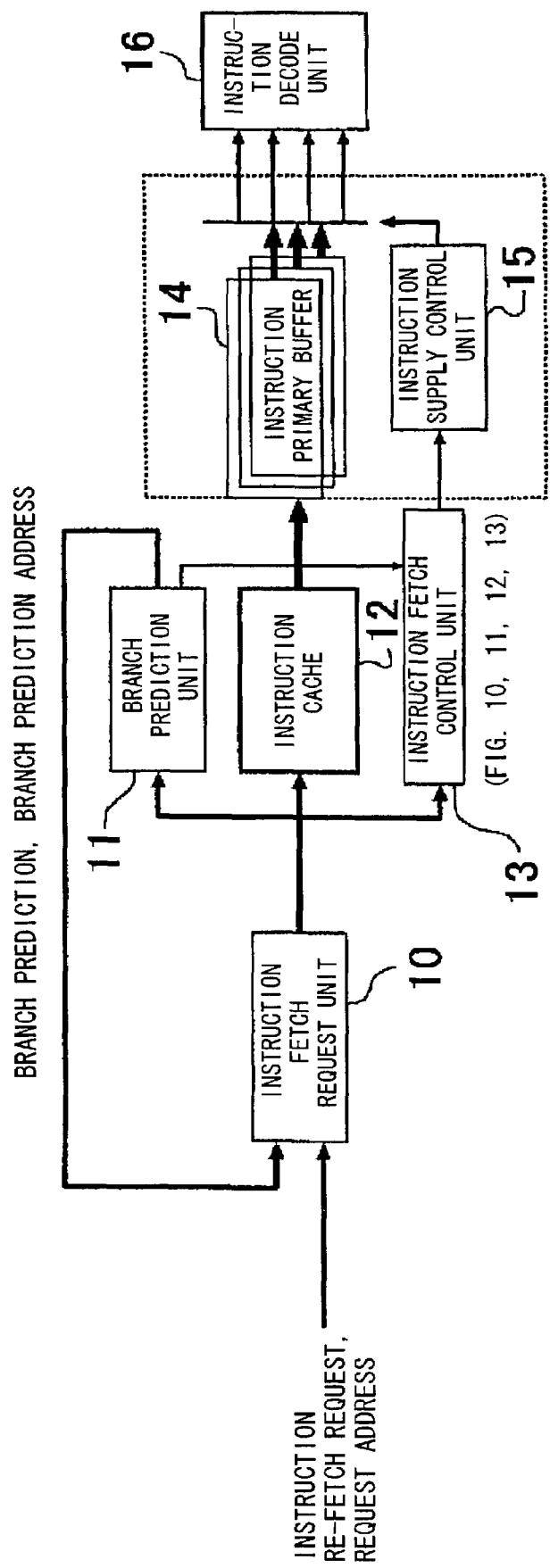
FIG. 6 shows an example of a central configuration of the information processing device to which the embodiments of the present invention are applied.

FIG. 6 shows an example of a central configuration of an information processing device to which an embodiment of the present invention is applied.

When an instruction re-fetch request or a request address is input into the instruction fetch request unit 10, an address at which an instruction is to be fetched, a valid flag of an instruction fetch, an instruction fetch ID, etc., are input from the instruction fetch request unit into an instruction cache 12, a branch prediction unit 11, and an instruction fetch control unit 13.

An instruction cache inputs an instruction at a specified address into an instruction buffer 14. The branch prediction unit 11 makes a branch prediction relating to the input instruction address, and feeds back a predicted branch target address, etc., obtained as a result of the branch prediction to the instruction fetch request unit 10. Furthermore, a signal indicating whether or not a branch prediction has been made is input from the branch prediction unit 11 to the instruction fetch control unit 13. The instruction fetch control unit 13 transmits the information for determination as to whether or not an instruction is to be issued from any of the instruction buffers 14.

The instruction supply control unit 15 selects any of the instruction buffers 14 according to the received information, and provides an instruction for an instruction decode unit 16.

To simplify the circuit, a connection target is limited to IB#0 (IB: instruction buffer). For example, if a control system of using available instruction buffers in order of a smaller number is adopted, the opportunity of connection is somewhat reduced although a pointer target is limited to IB#0, thereby indicating a larger merit of simplifying a circuit.

When an instruction fetch request is issued, the matching between a request address and an IAR0 (leading instruction address of IB#0) is detected. If they do not match, the connection in this method, this connecting method is not used. If they match, a connection is made in this method, and it can be determined whether or not a connection is made depending on the situation.

Depending on the executing method, the possibility of a connection can be determined by detecting whether or not the address range of an instruction buffer is maintained.

The embodiment relating to the determination as to whether or not a connection is made is described later.

Only because addresses match as described above, the connection is not always improved when a connection is constantly made because the branch condition can be changed next time. Especially, since a connection is to be made by detecting a case in which a short loop can be realized, it is important to find the feature.

A BCT (branch on count) instruction (an instruction predicted to be branched at a strong probability) in the IBM S/390 instruction set is a branch instruction to be used for loop control. If there is an instruction defined for loop control, it can be properly applied to this method. For example, ba is an unconditional branch instruction in the SPARC V9 instruction set. Thus, in an instruction set used in the actual information processing device, an unconditional branch instruction, or an instruction predicted to be branched at a strong probability is checked in advance. If any of the instructions is detected, the present embodiment is applied.

Otherwise, when there is a global history for combination use with a branch history if it is entered, it can be determined, for example, from the consecutive number of 'taken' that the feature of a loop instruction is detected by the corresponding entry of the global history.

It is also determined that a loop event has occurred when a branch prediction is successfully made frequently without an occurrence of a instruction re-fetch because the branch prediction success rate is constantly less than 95%.

In the branch prediction system, for example, a loop instruction flag is entered in the branch history upon completion of a BCT instruction or based on a determination result by the above mentioned global history using a branch history such as Japanese Patent Laid-open No. 9-218786, and the flag is read when a corresponding entry is read when the branch history is referred to.

When the flag is read together at a branch prediction, a short loop connection is attempted.

Then, the main circuit of the above mentioned instruction fetch request unit 10 is described by referring to FIGS. 6 and 7.

FIG. 7 shows an example of the configuration of the circuit generating IF-REQ-ID contained in the instruction fetch request unit 10.

The circuit shown in FIG. 7 searches an instruction buffer 1 invalidated according to the information stored in the pointer unit of each instruction buffer, and outputs the identification ID of the searched instruction buffer as IF-REQ-ID.

The details are described later, but a valid flag (Valid) indicating whether or not the instruction buffer 1 is valid is stored in the information held in the pointer unit of each instruction buffer. In FIG. 7, the valid flag read from the pointer unit of each instruction buffer is indicated as IBi_VALID (i=0~5). That is, IBi_VALID (i=0~5) indicates a valid flag of an instruction buffer #i (i=0~5).

In the circuit shown in FIG. 7, a priority is assigned to each instruction buffer 1, and the identification ID of the instruction buffer 1 having the highest priority in the instruction buffers whose valid flags indicate invalidity is output as IF-REQ-ID.

That is, to output such IF-REQ-ID, the circuit shown in FIG. 7 functions as follows.

When an input from an inverter circuit 111-0 is 'H' and the other inputs are 'L', that is, when at least the valid flag of an instruction buffer #0 indicates invalidity (IB0_VALID='L'), an encoder circuit (ENC) 113 outputs the identification ID of the instruction buffer #0 of 0 as IF-REQ-ID. The output signal of the inverter circuit 111-0 is also an IF-REQ-ID-EQ-0 signal.

In the present embodiment, 'H' indicates a logical 'H', and 'L' indicates a logical 'L'.

When an input from an AND circuit 112-1 is 'H' and the other inputs are 'L', that is, when at least the valid flag of an instruction buffer #0 indicates validity and the valid flag of the instruction buffer #1 indicates invalidity (IB1_VALID='L'), an encoder circuit 113 outputs the identification ID of the instruction buffer #1 of 1 as IF-REQ-ID. The output signal of the AND circuit 112-1 is also an IF-REQ-ID-EQ-1 signal.

When an input from an AND circuit 112-2 is 'H' and the other inputs are 'L', that is, when at least the valid flags of the instruction buffers #0 and #1 indicate validity and the valid flag of the instruction buffer #2 indicates invalidity (IB2_VALID='L'), the encoder circuit 113 outputs the identification ID of the instruction buffer #2 of 2 as IF-REQ-ID. The output signal of the AND circuit 112-2 is also an IF-REQ-ID-EQ-2 signal.

When an input from an AND circuit 112-3 is 'H' and the other inputs are 'L', that is, when at least the valid flags of the instruction buffers #0 through #2 indicate validity and the valid flag of the instruction buffer #3 indicates invalidity (IB3_VALID='L'), the encoder circuit 113 outputs the identification ID of the instruction buffer #3 of 3 as IF-REQ-ID. The output signal of the AND circuit 112-3 is also an IF-REQ-ID-EQ-3 signal.

When an input from an AND circuit 112-4 is 'H' and the other inputs are 'L', that is, when at least the valid flags of the instruction buffers #0 through #3 indicate validity and the valid flag of the instruction buffer #4 indicates invalidity (IB4_VALID='L'), the encoder circuit 113 outputs the identification ID of the instruction buffer #4 of 4 as IF-REQ-ID. The output signal of the AND circuit 112-4 is also an IF-REQ-ID-EQ-4 signal.

When an input from an AND circuit 112-5 is 'H' and the other inputs are 'L', that is, when at least the valid flags of the instruction buffers #0 through #4 indicate validity and the valid flag of the instruction buffer #5 indicates invalidity (IB5_VALID='L'), the encoder circuit 113 outputs the identification ID of the instruction buffer #5 of 5 as IF-REQ-ID. The output signal of the AND circuit 112-5 is also an IF-REQ-ID-EQ-5 signal.

If the valid flags of all instruction buffers indicate validity (IBi_VALID (i=0~5)='H'), the output of an AND circuit 112-6 indicates 'Y' (I-BUFFER-FULL). In this case, all the input of the encoder circuit 113 are 'L', and does not output IF-REQ-ID.

With the above mentioned configuration, higher priorities are assigned in the order of instruction buffers #0, #1, #2, #3, #4, and #5, and the identification ID of the instruction buffer having the highest priority is output as IF-REQ-ID.

Figure 8:
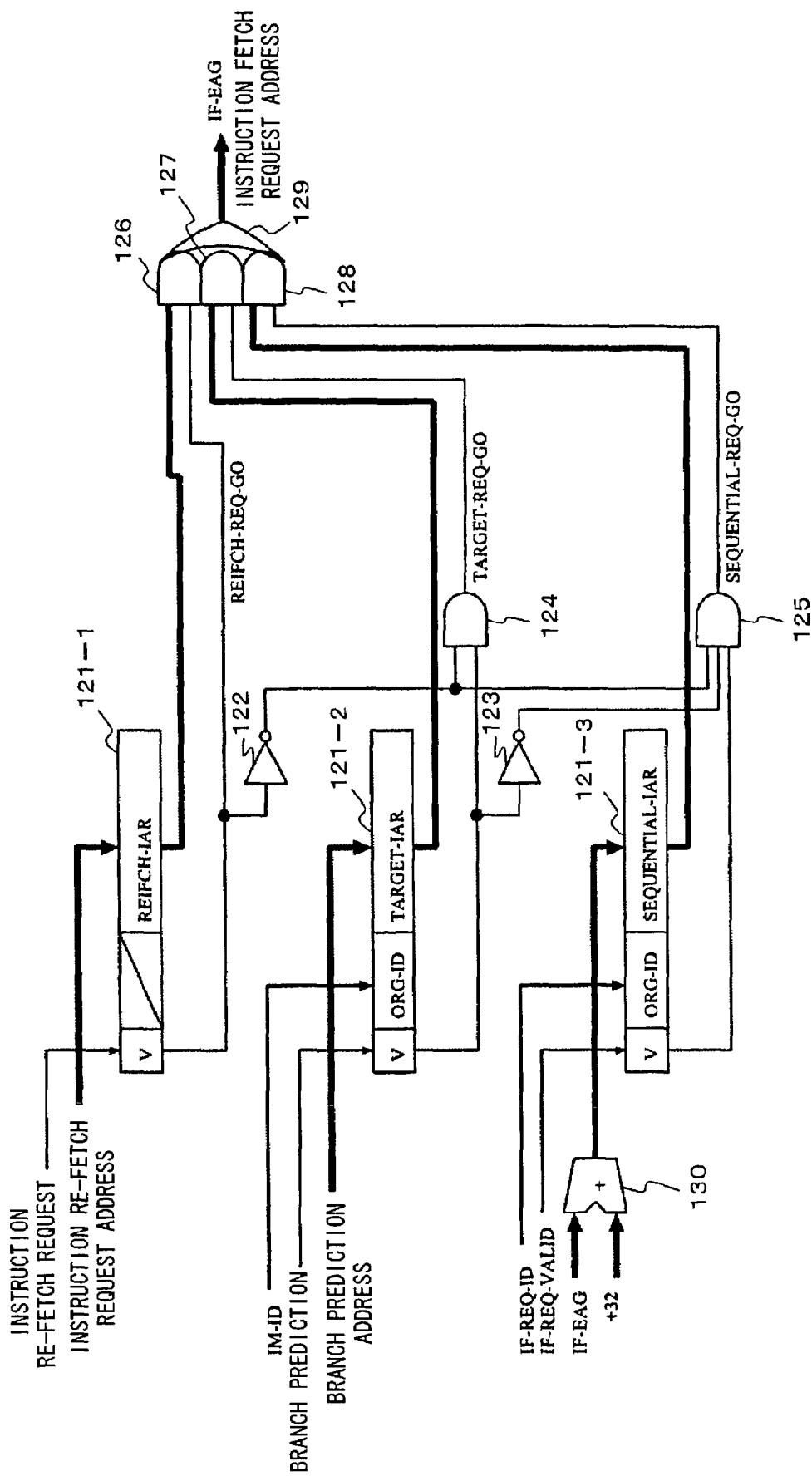
FIG. 8 shows an example of the configuration of the circuit generating an instruction fetch request address (IF-EAG) included in the instruction fetch request unit 10.

FIG. 8 shows an example of the configuration of the circuit generating an instruction fetch request address (IF-EAG) included in the instruction fetch request unit 10.

When an instruction re-fetch request is issued, the circuit shown in FIG. 8. outputs an instruction fetch request address. When a predicted branch target instruction fetch request, not an instruction re-fetch request, is issued, the circuit outputs a predicted branch target instruction fetch request. None of the instruction re-fetch request and the predicted branch target instruction fetch request are output (when a subsequent instruction fetch request is issued), a subsequent instruction fetch request address generated by adding 32 bytes is output.

Thus, higher priorities are assigned in the order of the instruction re-fetch request, the predicted branch target instruction fetch request, and the subsequent instruction fetch request, and a corresponding instruction fetch request address (IF-EAG) is output depending on the priorities.

Practically, when an instruction re-fetch request is issued, that is, an instruction re-fetch request signal and an instruction re-fetch request address are input, the instruction re-fetch request signal ('H') is stored as a valid flag in a register 121-1, and input into the AND circuit 126 and an inverter circuit 122. The instruction re-fetch request signal is also the REIFCH-REQ-GO signal. Furthermore, the instruction re-fetch request address is stored as REIFH-IAR in the register 121-1, and input into an AND circuit 26. On the other hand, since the output of the inverter circuit 122 indicates 'L' inverted from the instruction re-fetch request signal 'H', the outputs of AND circuits 124 and 125 connected to the output indicate 'L', and the outputs of AND circuits 127 and 128 connected to the output also indicate 'L'. Therefore, the IF-EAG which is the output of an OR circuit 129 is the output of an AND circuit 126, that is, REIFCH-IAR.

If an instruction re-fetch request is not issued, but a predicted branch target instruction fetch request is issued, that is, if a predicted branch target instruction fetch request signal and a predicted branch target instruction fetch request address are input, then the predicted branch target instruction fetch request ('H') is stored as a valid flag V (TARGET-VALID) in the register 121-2 (second register), and input into the AND circuit 124 and an inverter circuit 123. The predicted branch target instruction fetch request address is stored as TARGET-IAR in the register 121-2, and input into the AND circuit 127. On the other hand, since no instruction re-fetch request is issued, the output of the AND circuit 126 indicates 'L', the output of the inverter circuit 122 indicates 'H', and the output of the AND circuit 124 indicates 'H'. The output signal of the AND circuit 124 is also a TARGET-REQ-GO signal shown in FIG. 8. The output of the inverter circuit 123 indicates 'L' inverted from 'H' of the predicted branch target instruction fetch request signal, the output of the AND circuit 125 connected to the output of the inverter circuit 123 indicates 'L', and the output of the AND circuit 128 connected to the output of the AND circuit 125 also indicates 'L'. Therefore, the output of the OR circuit 129, that is, IF-EAG, is the same as the output of the AND circuit 127, that is, TARGET-IAR.

The register 121-2 stores IM-ID as ORG-ID (TARGET-ORG-ID, predicted branch target instruction fetch request source information). The IM-ID is IF-REQ-ID at branch prediction time, and the branch prediction is made in the IM stage of the five stages. Thus, when a predicted branch target instruction fetch request is issued, the identification ID of the instruction buffer corresponding to a predicted branch target instruction fetch request source can be held, and the association with the identification ID of the instruction buffer corresponding to the predicted branch target instruction fetch request source can be set.

When an instruction re-fetch request or a predicted branch target instruction fetch request is not issued (when a subsequent instruction fetch request is issued), an instruction fetch request signal (IF-REQ-VALID='H') is stored as a valid flag V (SEQUENTIAL-VALID) in the register 121-3 (first register), and input into the AND circuit 125. Furthermore, a subsequent instruction fetch request address generated by an adder 130 adding 32 bytes to IF-EAG is stored as SEQUENTIAL-IAR in the register 121-3, and input into the AND circuit 128. On the other hand, since no instruction re-fetch request or predicted branch target instruction fetch request is issued, REIFCH-REQ-GO and TARGET-REQ-GO indicate 'L', and the outputs of the AND circuits 126 and 127 indicate 'L'. The outputs of the inverter circuits 122 and 123 indicate 'H', and the output of the AND circuit 125 indicates 'H', and input into the AND circuit 128. Therefore, the output of the OR circuit 129, that is, IF-EAG, is the same as the output of the AND circuit 128, that is, SEQUENTIAL-IAR. The output signal of the AND circuit 125 is also a SEQUENTIAL-REQ-GO signal shown in FIG. 8.

The register 121-3 stores IF-REQ-ID as ORG-ID (SEQUENTIAL-ORG-ID, subsequent instruction fetch request source information). Thus, when a subsequent instruction fetch request is issued, the identification ID of the instruction buffer corresponding to the subsequent instruction fetch request source is stored, and can be associated with the identification ID of the instruction buffer corresponding to the subsequent instruction fetch request.

The register 121-1 does not store IF-REQ-ID because, when a instruction re-fetch request is issued, all valid flags of the data portion of each instruction buffer are invalidated and sequentially used from the instruction buffer #0, and it is not necessary to store the identification ID of the instruction buffer corresponding to the instruction re-fetch request source.

With the above mentioned configuration, the instruction fetch request address corresponding to each instruction fetch request is output, and the identification ID, etc., of the instruction buffers corresponding to the predicted branch target instruction fetch request source and the subsequent instruction fetch request source are stored.

Described below is the information stored in the pointer unit of the instruction buffer. The information is stored (set) by the instruction fetch control unit 13.

Figure 9:
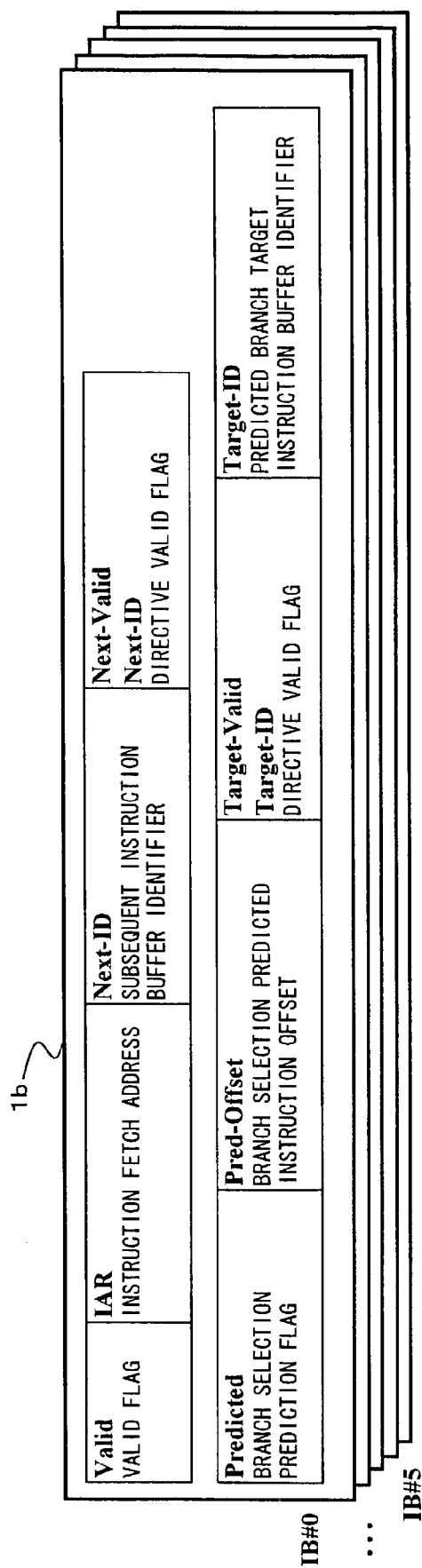
FIG. 9 shows an example of the information stored in a pointer unit of an instruction buffer.

FIG. 9 shows an example of the information stored in the pointer unit of the instruction buffer.

As shown in FIG. 9, the pointer unit stores the information such as a valid flag (Valid), an instruction fetch address (IAR), a branch selection prediction flag (Predicted), a branch selection predicted instruction offset (Pred-Offset), a subsequent instruction buffer identifier (Next-ID, first directive information), Next-ID directive valid flag (Next-Valid), a predicted branch target instruction buffer identifier (Target-ID, second directive information), and a Target-ID directive valid flag (Target-Valid), etc.

A valid flag indicates whether or not the instruction buffer is valid.

An instruction fetch address (IAR) is an instruction fetch address (IF-EAG) corresponding to the instruction sequence stored in the data portion of the instruction buffer.

These valid flags and instruction fetch addresses are set in the pointer unit when an instruction fetch request is issued and an instruction sequence corresponding to IF-EAG is stored in the instruction buffer 1 corresponding to IF-REQ-ID.

A branch selection prediction flag indicates whether or not a branch selection predicted instruction is included in the instruction sequence stored in the instruction buffer.

A branch selection predicted instruction offset indicates the position of a predicted instruction in the instruction sequence when a branch selection predicted instruction is included in the instruction sequence stored in the instruction buffer. Thus, the position of the branch selection predicted instruction is easily determined at instruction issue time by storing the branch selection predicted instruction offset.

The branch selection prediction flag and the branch selection predicted instruction offset are set according to the information obtained by the above mentioned branch prediction unit 3.

A subsequent instruction buffer identifier indicates the identifier of an instruction buffer storing the subsequent instruction sequence to be provided after the instruction sequence stored in the current instruction buffer, and set when the subsequent instruction fetch request corresponding to the instruction buffer 1 is issued.

A Next-ID directive valid flag indicates whether or not a subsequent instruction buffer identifier is valid. When a subsequent instruction buffer identifier is set, a flag indicating validity is set.

A predicted branch target instruction buffer identifier indicates an identifier of an instruction buffer storing a predicted branch target instruction sequence to be provided after the instruction sequence stored in the current instruction buffer, and is set when a predicted branch target instruction fetch request corresponding to the current instruction buffer is issued.

A Target-ID directive valid flag indicates whether or not a predicted branch target instruction buffer identifier is valid. A flag indicating validity is set when a predicted branch target instruction buffer identifier is set.

In FIG. 9, the above mentioned information is stored in the pointer unit. However, the information stored in the pointer unit is not limited to the above mentioned information, but at least a subsequent instruction buffer identifier, a Next-ID directive valid flag, a predicted branch target instruction buffer identifier, and a Target-ID directive valid flag can be stored in the pointer unit.

Figure 10:
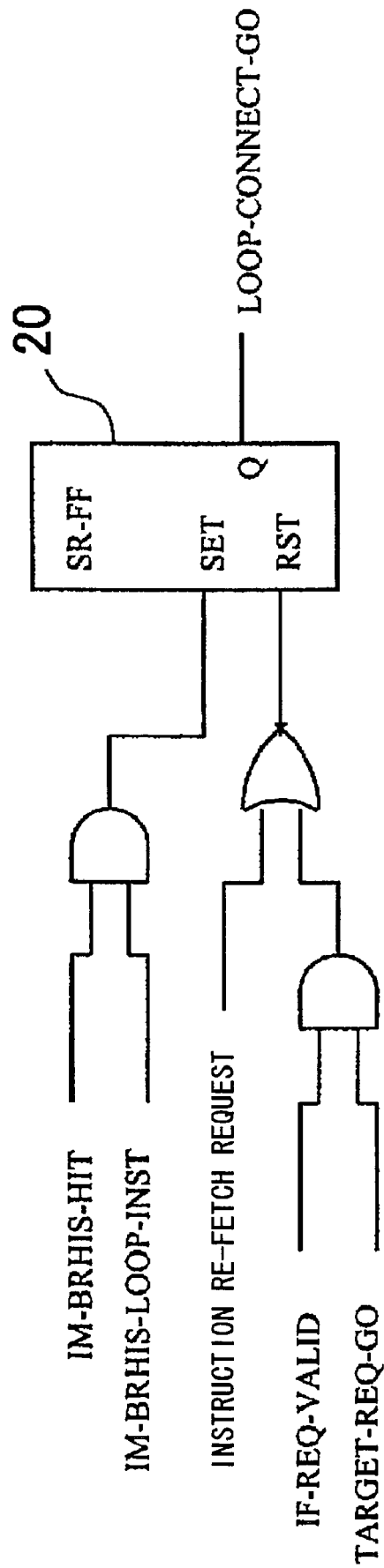
FIG. 10 shows an example of the configuration of a condition generation circuit for attempting a loop connection.

FIG. 10 shows an example of the configuration of a condition generation circuit for attempting a loop connection.

The circuit shown in FIG. 10 is to be included in the instruction fetch control unit 13 shown in FIG. 4.

First, if the branch history is hit in the IM cycle (IM_BRHIS_HIT), and a loop is found in the branch history in the IM cycle (IM_BRHIS_LOOP_INST), then a flip-flop 20 is set, and a signal (LOOP_CONNECT_GO) indicating a loop connection is output. The method for finding a loop in the branch history is performed by detecting an instruction assumed to form a loop, or detecting a portion of repeatedly executing the same instruction in the branch history.

In the circuit shown in FIG. 10, if an instruction re-fetch request is input, or an instruction fetch request is valid (IF-REQ-VALID) and a signal (TARGET-REQ-GO) for start of a request to obtain a connection target instruction, then the flip-flop 20 is reset, and a signal (LOOP_CONNECT_GO) indicating a loop connection is reset.

If a connection is successfully made, then an instruction buffer is repeatedly used plural times. Therefore, unless it is necessary to release a connection, the nullification (release) is suppressed after issuing an instruction (after supplying all necessary instructions from an instruction buffer).

Figure 11:
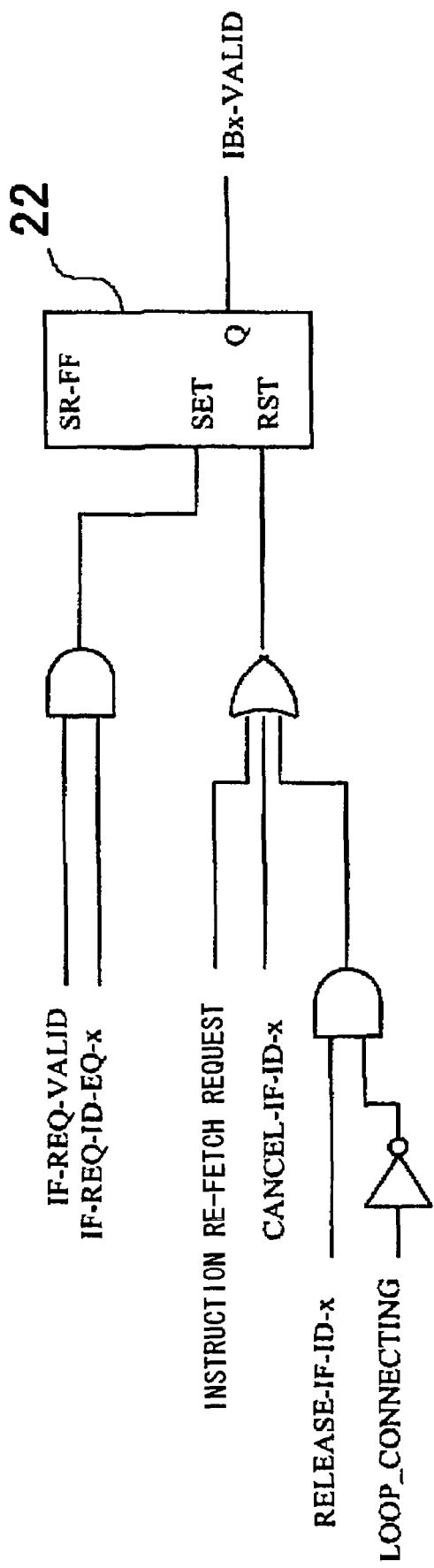
FIG. 11 shows an example of a circuit for setting a valid flag of an instruction buffer with a loop connection taken into account.

FIG. 11 shows an example of a circuit for setting a valid flag of an instruction buffer with a loop connection taken into account. The circuit shown in FIG. 11 is to be provided in the instruction fetch control unit shown in FIG. 6.

In FIG. 11, if an instruction fetch request is valid (IF-REQ-VALID), and a signal (IF-REQ-ID-EQ-x) indicating that the buffer number of an instruction fetch request target is x is input, then a flip-flop 22 is set, and a flag (IBx_VALID) indicating that the x-th instruction buffer is valid is set. The circuit shown in FIG. 11 is provided for each of the instruction buffers, and the value of x discriminates the instruction buffers.

If an instruction re-fetch request or an instruction fetch in the x-th instruction buffer is canceled, or the x-th instruction fetch terminates (RELEASE_IF_ID_x), and a loop is being connected (LOOP_CONNECTING), then the flip-flop 22 is reset, and the valid flag of the x-th instruction buffer is reset.

Furthermore, if there can be partial cancellation for any reason other than issuing an instruction such as cancellation of a preceding speculative fetch due to a delay of a branch prediction, then there can be the possibility that a completed loop structure is interrupted by the cancellation, and the supply of an instruction can be hung up. Especially, since a connection can be made for a canceled event in principle, consideration is required. A countermeasure is, for example, to suppress the canceling operation in this case as described above.

Another countermeasure is to predict the cancellation of this case and stopping connecting it in advance (removing it from connection targets) According to the present embodiment, a possible connection timing can be conveniently limited to a predicted branch target fetch request time because a speculative fetch by a branch prediction wait has been canceled.

Figure 12:
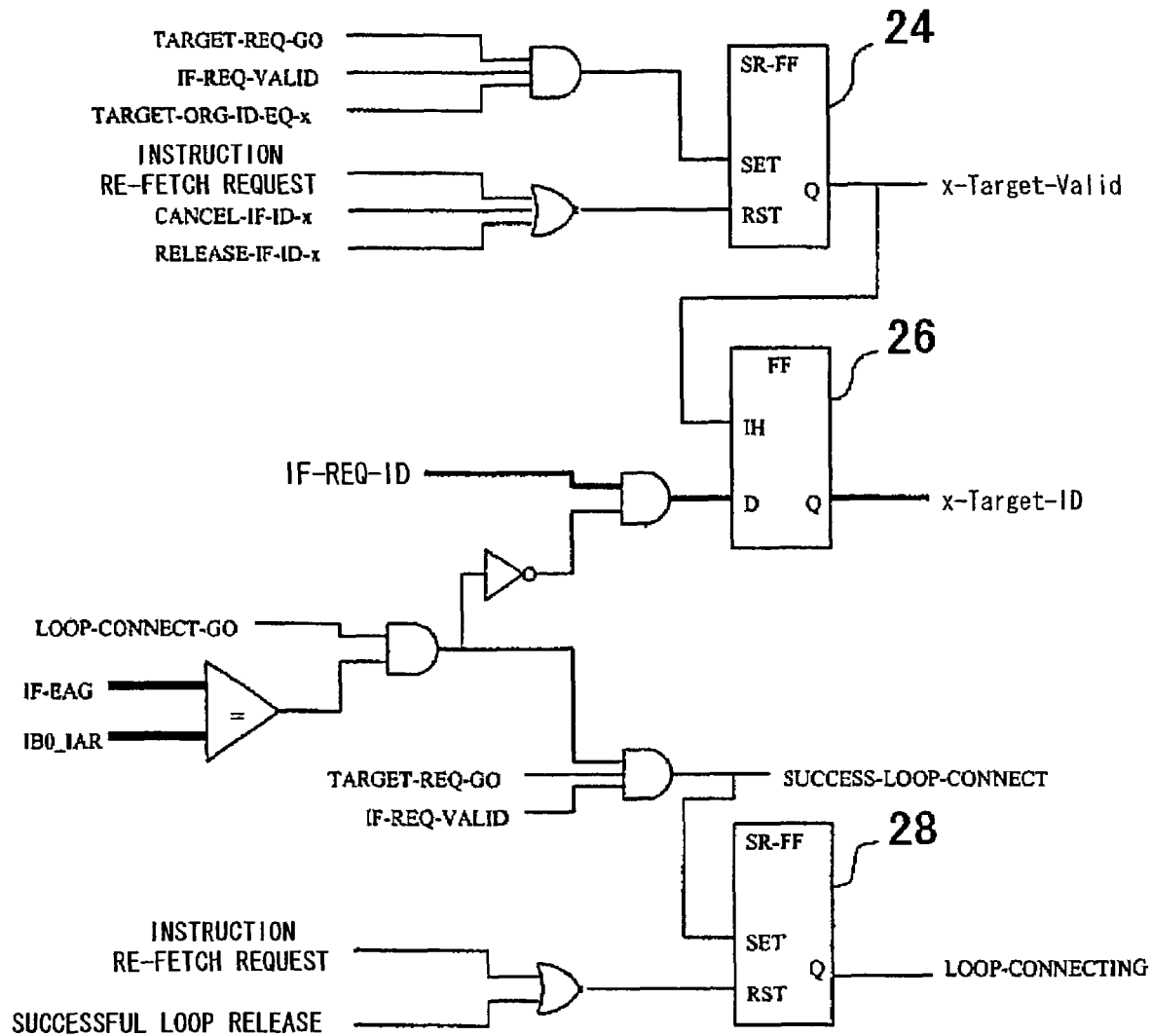
FIG. 12 shows an example of a circuit of a predicted branch target identifier setting circuit with a loop connection taken into account.

FIG. 12 shows an example of a circuit of a predicted branch target identifier setting circuit with a loop connection taken into account.

The circuit shown in FIG. 12 is to be provided in the instruction fetch control unit 13 shown in FIG. 6. The circuit is provided for each of the instruction buffers, and corresponds to each instruction buffer. The character 'x' added to the name of a signal discriminates each instruction buffer.

In FIG. 12, if a connection target (predicted branch target) request is made (TARGET-REQ-GO), an instruction fetch request is valid (IF-REQ-VALID), and the instruction buffer of a branch prediction source is the x-th buffer (TARGET_ORG_ID_EQ_x), then a flip-flop 24 is set, and a signal indicating that the x-th instruction buffer is valid (x_TARGET_Valid) is output. If an instruction re-fetch request or an instruction request for the x-th instruction buffer is canceled (CANCEL_IF_ID_x) or the execution termination (RELEASE_IF_ID_x) of an instruction of the x-th instruction buffer is input, then the flip-flop 24 is reset, and x_TARGET_Valid is reset.

If the address (IF-EAG) of an instruction fetch request matches the address (IB0_IAR) of the 0-th instruction buffer, and an instruction to connect a loop (LOOP_CONNECT_GO) is issued, then the value of 0 is set in a flip-flop 26, and the 0-th instruction buffer is specified as the connection target instruction buffer of the x-th instruction buffer (x_target_ID=0). However, unless the above mentioned condition is satisfied, the instruction buffer number (IF-REQ-ID) specified by the instruction fetch request is input into the flip-flop 26, and the instruction buffer number specified by the instruction fetch request is output as x_target_ID. However, it is limited to the case in which x_Target_Valid is set.

If IF-EAG matches IB0_IAR, and there is a loop generate instruction (LOOP_CONNECT_GO), and furthermore a connection target instruction request is issued (TARGET-REQ-GO) and an instruction fetch request is valid (IF-REQ-VALID), then a signal (SUCCESS_LOOP_CONNECT) indicating a successful loop connection is output, and the signal is input into a flip-flop 28, and a signal indicating a loop connection state (LOOP_CONNECTING) is output. However, if an instruction re-fetch request and a successful loop release signal are input, the flip-flop 28 is reset, and LOOP_CONNECTING is reset to indicate the termination of the loop connection state.

Assume that the identifier of the source instruction buffer requesting a predicted branch target instruction fetch is p, and the identifier (IF-REQ-ID) of the instruction buffer reserved by the issued instruction fetch request is q. Normally, a pointer is set such that the logical subsequence of IB#p can be TB#q, but actually the logical subsequence of IB#p is set to IB#0. For example, in this case, since the predicted branch target instruction fetch is considered, the predicted branch target instruction buffer identifier (p_TARGET_ID) can be set to 0.

In FIG. 12, the connection target when a loop is formed is set as the 0-th instruction buffer so that the circuit shown in FIG. 12 can be simplified, and practically optional instruction buffers can be connected with each other to form a loop.

The connection state described so far, that is, the loop structure closed in an instruction buffer can be released in the following method.

In the above mentioned embodiment, the relationship of p→q has been set to p→0, and an instruction fetch request corresponding to IB#q has been issued (without suppression or cancellation) Therefore, if the relationship p→q is restored and the loop connection is released (simultaneously suppressed cancellation is released), then a normal operation can be resumed.

Figure 13:
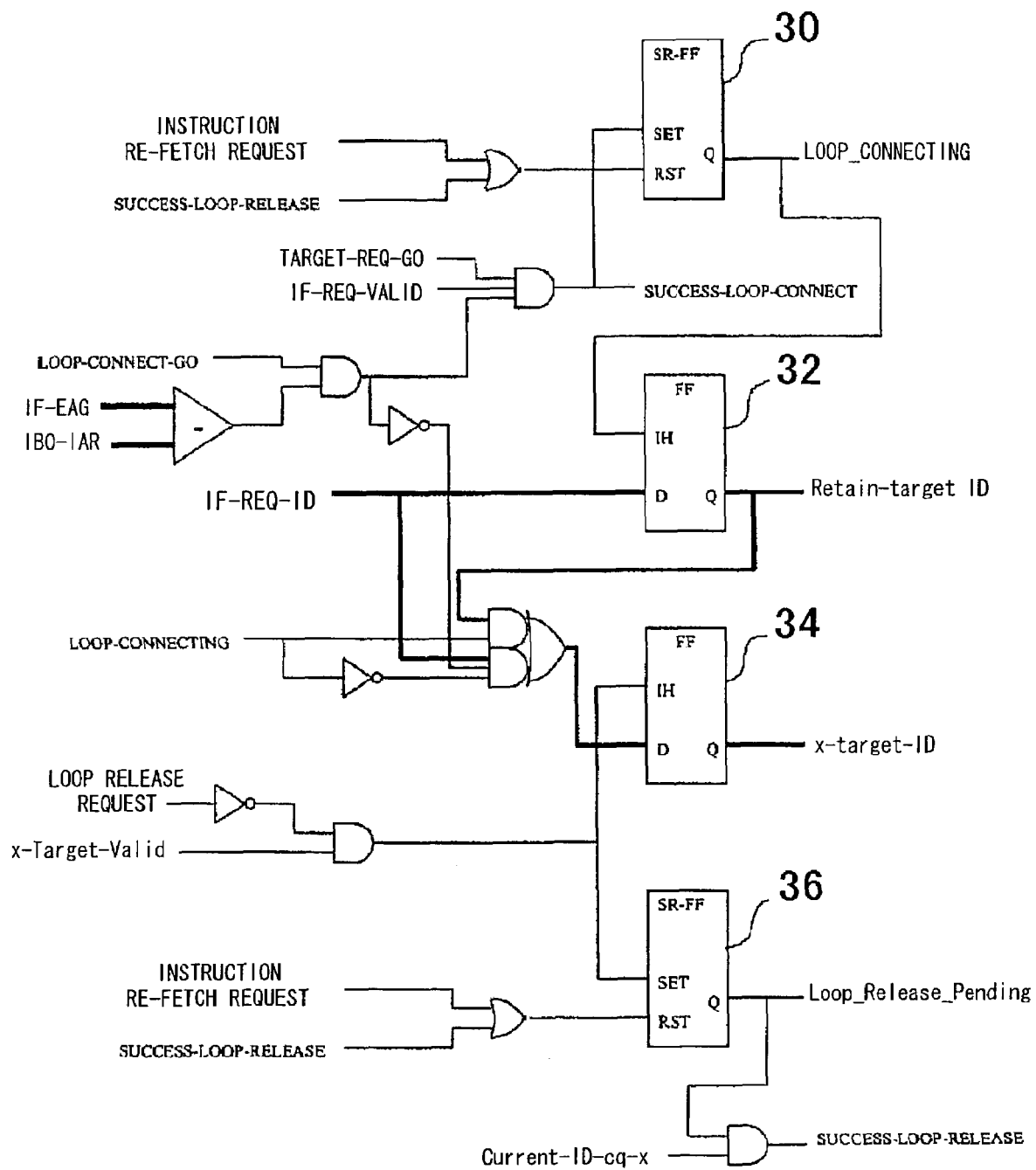
FIG. 13 shows an example of a circuit for releasing a loop.

FIG. 13 shows an example of a circuit for releasing a loop.

FIG. 13 shows a circuit to be provided in the instruction fetch control unit shown in FIG. 6, and the circuit is to be provided for each instruction buffer.

The SUCCESS_LOOP_RELEASE signal shown in FIG. 13 is the same as the signal indicating a successful loop release.

A flip-flop 30 is reset when an instruction re-fetch request or a SUCCESS_LOOP_RELEASE signal is input. If IF-EAG matches IB0_IAR, a signal indicating a loop to be formed (LOOP_CONNECT_GO) is issued, and an execution directive signal (TARGET-REQ-GO) of a branch target instruction fetch request and an instruction fetch request are valid (IF-REQ-VALID), then a SUCCESS_LOOP_CONNECT signal is output, and the flip-flop 30 is set, thereby outputting a LOOP_CONNECTING signal.

The number (IF-REQ-ID) of an instruction buffer for an instruction fetch is input into a flip-flop 32, and the connection target instruction buffer ID required to form a loop is maintained (Retain_target_ID) while LOOP_CONNECTING is output. If LOOP_CONNECTING is output, Retain_target_ID is input into a flip-flop 34, no loop release request is issued, and the x-th connection target instruction buffer is valid (x_TARGET_Valid), then the number of an instruction buffer of Retain_target_ID is output as x_target_ID.

If LOOP_CONNECTING is a logical value of false, and IF-EAG does not match IB0_IAR or LOOP_CONNECTING is a logical value of false, then the value of IF-REQ-ID is output as x_target_ID. If an instruction fetch request is input in a normal manner, it indicates an instruction fetch according to the instruction fetch request.

Furthermore, if there is no loop release request and x_Target_Valid is the logical value of true, then a flip-flop 36 is set, and a signal indicating that a loop is being released (Loop_Release_Pending) is output. If an instruction re-fetch request or SUCCESS_LOOP_RELEASE is input, then Loop_Release_Pending is reset. If Loop_Release_Pending and the current instruction buffer number are equal to 'x' (Current_ID_eq_x), then SUCCESS_LOOP_RELEASE is output, and a signal of a successful loop release is output.

As described above, the present invention greatly contributes to the improvement of the performance of an information processing device when a loop is formed by instructions stored in an instruction buffer especially when a short loop is used by saving time in a branch prediction which has been made each time a process is repeatedly performed.

What is claimed is:

1. An apparatus for controlling instruction fetch, comprising:
    an instruction buffer unit having a plurality of instruction buffers and a plurality of pointer units, wherein each of the plurality of pointer units corresponds to each of the instruction buffers and indicates a connection relation of the instruction buffers via numerical instruction buffer IDs, each of the plurality of pointer units including a valid flag for indicating that the corresponding instruction buffer is validated;
    a connection relation establishment unit establishing the connection relation between instruction buffers different from another connection relation established by an instruction fetch request, whereby the connection relation establishment unit reuses a fetched instruction in one of the instruction buffers; and
    a loop-state structure connecting unit connecting the instruction buffers into a loop by the plurality of pointer units, wherein
    each of the pointer units points to any one of the instruction buffers, and
    once the loop-state structure connecting unit connects the loop, the validated instruction buffer is not invalidated until the loop is released.

2. The apparatus according to claim 1, wherein
when, relative to an instruction in an instruction buffer, an address of a logically subsequent instruction to the instruction is in an address range of a valid instruction buffer, a corresponding address of the valid instruction buffer is defined as a connection target of the instruction in the instruction buffer.

3. The apparatus according to claim 1, wherein
when, relative to an instruction in an instruction buffer, an address of a logically subsequent instruction to the instruction matches a leading instruction address of any of a plurality of valid instruction buffers, the leading instruction address is defined as a connection target of the instruction in the instruction buffer.

4. The apparatus according to claim 1, wherein
when a branch instruction is detected or predicted in an instruction buffer, a branching instruction is associated with a branch target instruction which is an instruction sequence corresponding to a branch target in a plurality of valid instruction buffers already storing instructions.

5. The apparatus according to claim 1, wherein
an instruction establishing the connection relation between instruction buffers different from the instruction fetch request is a branch instruction or a branch predicted instruction.

6. The apparatus according to claim 5, wherein
the connection relation between instruction buffers different from the instruction fetch request is established only for a branch instruction predicted to be unconditionally branching or branching at a strong probability in the branch instructions.

7. The apparatus according to claim 1, wherein
the instruction establishing the connection relation between instruction buffers different from the instruction fetch request is determined by detecting a loop of instruction execution from a branch prediction system.

8. The apparatus according to claim 1, further comprising
a unit releasing the relation between instruction buffers for which the connection relation different from the instruction fetch is established.

9. A method for controlling instruction fetch, comprising:
having a plurality of instruction buffers and a plurality of pointer units, wherein each of the plurality of pointer units corresponds to each of the instruction buffers and indicates a connection relation of the instruction buffers via numerical instruction buffer IDs, each of the plurality of pointer units including a valid flag for indicating that the corresponding instruction buffer is validated;
establishing the connection relation between instruction buffers different from another connection relation established by an instruction fetch request in order to reuse a fetched instruction in one of the instruction buffers; and
making a loop-state structure of the instruction buffers corresponding to the fetched instruction, wherein
each of the pointer units points to any one of the instruction buffers, and once the loop-state is established, the validated instruction buffer is not invalidated until the loop-state is released.

10. The method according to claim 9, wherein when, relative to an instruction in an instruction buffer, an address of a logically subsequent instruction to the instruction is in an address range of a valid instruction buffer, a corresponding address of the valid instruction buffer is defined as a connection target of the instruction in the instruction buffer.

11. The method according to claim 9, wherein when, relative to an instruction in an instruction buffer, an address of a logically subsequent instruction to the instruction matches a leading instruction address of any of a plurality of valid instruction buffers, the leading instruction address is defined as a connection target of the instruction in the instruction buffer.

12. The method according to claim 9, wherein when a branch instruction is detected or predicted in an instruction buffer, a branching instruction is associated with a branch target instruction which is an instruction sequence corresponding to a branch target in a plurality of valid instruction buffers already storing instructions.

13. The method according to claim 9, wherein an instruction establishing the connection relation between instruction buffers different from the instruction fetch request is a branch instruction or a branch predicted instruction.

14. The method according to claim 13, wherein the connection relation between instruction buffers different from the instruction fetch request is established only for a branch instruction predicted to be unconditionally branching or branching at a strong probability in the branch instructions.

15. The method according to claim 9, wherein the instruction establishing the connection relation between instruction buffers different from the instruction fetch request is determined by detecting a loop of instruction execution from a branch prediction system.

16. The method according to claim 9, further comprising releasing the relation between instruction buffers for which the connection relation different from the instruction fetch is established.

* * * * *